(12) United States Patent
Dahl et al.

(10) Patent No.: US 11,118,571 B2
(45) Date of Patent: Sep. 14, 2021

(54) LIGHTNING PROTECTION ARRANGEMENT

(71) Applicant: Siemens Gamesa Renewable Energy A/S, Brande (DK)

(72) Inventors: Flemming Dahl, Hals (DK); Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 147 days.

(21) Appl. No.: 16/478,511

(22) PCT Filed: Nov. 9, 2017

(86) PCT No.: PCT/EP2017/078778
§ 371 (c)(1),
(2) Date: Jul. 17, 2019

(87) PCT Pub. No.: WO2018/137806
PCT Pub. Date: Aug. 2, 2018

(65) Prior Publication Data
US 2019/0390656 A1    Dec. 26, 2019

(30) Foreign Application Priority Data

Jan. 24, 2017   (DE) .......................... 102017201093.2

(51) Int. Cl.
*F03D 1/06*   (2006.01)
*F03D 80/30*  (2016.01)

(52) U.S. Cl.
CPC ........... *F03D 80/30* (2016.05); *F03D 1/0675* (2013.01); *F05B 2240/30* (2013.01)

(58) Field of Classification Search
CPC ..... F03D 80/30; F03D 1/0675; F05B 2240/30
See application file for complete search history.

(56) References Cited

U.S. PATENT DOCUMENTS 10,030,634 B2 * 7/2018 Tanaka .................... F03D 80/30
10,436,175 B2 * 10/2019 Kuhn ....................... F03D 13/10
(Continued)

FOREIGN PATENT DOCUMENTS

CN          101354016 A      1/2009
CN          101517227 A      8/2009
(Continued)

OTHER PUBLICATIONS

Office Action in related Chinese Patent Application No. 21780084526.4, dated Apr. 9, 2020. 7 pages.
(Continued)

*Primary Examiner* — Eldon T Brockman
(74) *Attorney, Agent, or Firm* — Schmeiser, Olsen & Watts LLP

(57) ABSTRACT

Provided is a lightning protection arrangement of a wind turbine rotor blade, including at least one terminal connected to a down conductor arranged in the blade interior and a number of lightning attractors electrically connected to the terminal; and wherein at least one lightning attractor includes an interior connector for making electrical contact to the terminal; and a trailing edge receptor arranged to extend beyond the trailing edge of the rotor blade in a direction opposite to the direction of travel of the rotor blade A wind turbine rotor blade including, a lightning protection arrangement, a method of equipping a wind turbine rotor blade with such a lightning protection arrangement is also provided.

12 Claims, 4 Drawing Sheets

(56) References Cited

U.S. PATENT DOCUMENTS

| | | | |
|---|---|---|---|
| 2009/0246025 A1* | 10/2009 | Lewke | F03D 1/0675 416/146 R |
| 2010/0047070 A1* | 2/2010 | Slot | F03D 80/30 416/146 R |
| 2014/0003958 A1 | 1/2014 | Turner et al. | |
| 2016/0290321 A1 | 10/2016 | Tanaka et al. | |
| 2017/0016426 A1 | 1/2017 | Kuhn | |

FOREIGN PATENT DOCUMENTS

| | | | |
|---|---|---|---|
| CN | 102661240 A | 9/2012 | |
| CN | 106164481 A | 11/2016 | |
| EP | 2019204 A1 | 1/2009 | |
| EP | 2226497 | 9/2010 | |
| EP | 2226497 A1 | 9/2010 | |

OTHER PUBLICATIONS

International Search Report dated Feb. 9, 2018 for Application No. PCT/EP2017/078778.
ISA/EPO; International Search Report for Application PCT/EP2017/0788778 dated Feb. 9, 2018.
Office Action in corresponding Chinese Patent Application No. 201780084526.4 dated Dec. 2, 2020. 8 pages.

* cited by examiner

LIGHTNING PROTECTION ARRANGEMENT

CROSS-REFERENCE TO RELATED APPLICATIONS

This application claims priority to PCT Application No. PCT/EP2017/078778, having a filing date of Nov. 9, 2017, based off of German Application No. 10 2017 201 093.2 having a filing date of Jan. 24, 2017, the entire contents both of which are hereby incorporated by reference.

FIELD OF TECHNOLOGY

The following relates to d a wind turbine rotor blade lightning protection arrangement; a wind turbine rotor blade; and a method of equipping a wind turbine rotor blade with a lightning protection arrangement.

BACKGROUND

A wind turbine is generally equipped with a lightning protection system (LPS) to minimize or avoid damage during a lightning strike. A lightning strike can occur at any exposed part of the wind turbine, and these are generally equipped with specialized arrangements of receptors and down conductors. With increasing tower height and blade length, particularly in the case of offshore wind turbines, the blades are generally most vulnerable to lightning strikes. Also, in geographical regions with a high incidence rate of electrical storms, even the blades of a wind turbine of relatively moderate height can be exposed to many lightning strikes per year. To protect the rotor blades, a prior approach is to arrange a receptor at a suitable position at the blade surface, and to connect this to a down conductor running along the length of the blade interior. Usually, one receptor is arranged at the rotor blade tip, and a number of side receptors are distributed along the surface of the rotor blade over some part of its length.

A known type of receptor (or "attractor") consists of a solid metal piece, with a head that is almost flush with the external surface of the rotor blade, and a threaded connector screwed into a terminal or base arranged inside the rotor blade. The terminal is electrically grounded by the down conductor. In this known approach, the lightning receptor is recessed in the blade surface. During an electrical storm, a static field of charged particles (the "ion cloud") will form around any exposed object that behaves as an attractor, for example the rotor blades, each of which collects an ion cloud around its blade, particularly in the blade tip regions. However, when a wind turbine is operational in the build up to an electrical storm or during an electrical storm, the ion cloud around the wind turbine blades will be flushed past the trailing edges of the blades. This is caused by the air flow over the suction side of the blade surface, which acts to displace the ion cloud towards the vacuum pocket flowing the trailing edge of the blade. The effectiveness of a prior art receptor is therefore compromised by the rotation of the blades, which results in the receptor being less than optimally placed in the ion cloud. Since the effectiveness of a rotor blade depends to a large extent on how well the boundary layer of the airflow can be maintained, the outer surface of the prior art receptor must not extend too far outward from the surface of the blade. Instead, the receptor is recessed into the blade body, and the greater part of its bulk is below the surface of the blade. The bulk is required to withstand the very high currents during a lightning strike. Therefore, the problem of the displaced ion cloud and reduced receptor efficiency cannot be remedied by simply moving the prior art receptor laterally towards the thinner trailing edge region of the blade, since this would expose most of its bulk, which would greatly interfere with the aerodynamic performance of the blade.

Furthermore, there are structural risks associated with the prior art receptor since this is embedded in the rotor blade to essentially lie flush with the blade surface. In the event of a lightning strike to the receptor, the blade surface is often burned in the region surrounding the receptor's exposed surface. This heat damage can result in cracks, which in turn permit moisture to enter. Any moisture present under the blade skin in this region can result in a steam explosion in a subsequent lightning strike. Blade failure and/or expensive repair work may ensue from this type of damage.

SUMMARY

An aspect relates to an improved rotor blade lightning protection arrangement that overcomes the problems outlined above.

According to the embodiments of the invention, the lightning protection arrangement of a wind turbine rotor blade comprises at least one terminal connected to a down conductor arranged in the blade interior and a number of lightning receptors electrically connected to the terminal; and wherein at least one receptor comprises a terminal connector for making electrical contact to the terminal; and a trailing edge receptor arranged to extend beyond the trailing edge of the rotor blade in a direction opposite to the direction of travel of the rotor blade. In the context of the embodiments of the invention, the terminal connector and the trailing edge receptor may be formed as one, or electrically connected to each other, so that the terminal connector and the trailing edge receptor may be regarded as a single electrically conducting component.

An advantage of the inventive rotor blade lightning protection arrangement is that the lightning attachment point is moved outward from the blade surface, thereby avoiding the problems of the known lightning protection means described in the introduction. During operation of the wind turbine, the trailing edge receptor of the inventive lightning protection arrangement will move the lightning attachment point away from the blade into the wake of the trailing edge. The receptor is made more attractive—i.e. more likely to attract a lightning strike—by the trailing edge receptor protruding into the ion cloud that immediately trails behind the blade as it moves through the air. When the blades are stationary, the inventive rotor blade lightning protection arrangement is equally effective, since the trailing edge receptor still acts to move the lightning attachment point away from the blade structure.

A wind turbine rotor blade comprises a root region, an airfoil region and a blade tip region. According to the embodiments of the invention, the wind turbine rotor blade further comprises a lightning protection arrangement of the type described above, with at least one terminal connected to a down conductor arranged in the blade interior, and at least one lightning attractor with a trailing edge receptor arranged to extend beyond the trailing edge of the rotor blade in a direction opposite to the direction of travel of the rotor blade.

Because the trailing edge receptor moves the point of attraction further out from the blade in the direction of the trailing edge, an actual lightning strike will "hit" the receptor at a distance from the blade surface. This avoids the material and structural damage described above, so that the durability or lifetime of a rotor blade that implements the inventive lightning protection arrangement can be favourably extended. This is particularly the case for the rotor blades of wind turbines installed in areas with high lightning strike frequency.

According to the embodiments of the invention, the method of equipping a wind turbine rotor blade with a lightning protection arrangement comprises the steps of providing at least one terminal in the blade interior and electrically connecting the terminal to a down conductor arranged in the blade interior; providing a lightning attractor comprising a trailing edge receptor arranged to extend beyond the trailing edge of the rotor blade in a direction opposite to the direction of travel of the rotor blade; and electrically connecting the trailing edge receptor to the terminal.

The steps of the inventive method can be carried out on a newly constructed blade prior to installation, whereby a lightning attractor with a trailing edge receptor can replace a lightning attractor of a conventional rotor blade lightning protection arrangement, or can be implemented in addition to the lightning attractor(s) of the conventional rotor blade lightning protection arrangement. Equally, the steps of the inventive method can be carried out to retro-fit the lightning protection arrangement of an already installed rotor blade.

Particularly advantageous embodiments and features of the embodiments of the invention are given by the dependent claims, as revealed in the following description. Features of different claim categories may be combined as appropriate to give further embodiments not described herein.

In the following, the terms "wind turbine rotor blade", "rotor blade" and "blade" are synonyms and may be used interchangeably in the following.

In the following, it may be assumed that the wind turbine comprises an LPS in which the down conductors of the rotor blades are electrically connected through the hub and the wind turbine tower to ground. The skilled person will be familiar with the means necessary to achieve an uninterrupted current path from the down conductors of the blades to ground, and details will not be discussed in any detail in the following.

In the following, without restricting the embodiments of the invention in any way, it may be assumed that a lightning attractor comprises an electrically conductive material, preferably copper and/or stainless steel, or any other suitable metal. Preferably, the material of the lightning attractor is the electrical equivalent of the material of the terminal. The terms "receptor", "attractor", and "lightning attractor" may be regarded as synonyms and are used interchangeably in the following.

A lightning attractor is preferably connected to the terminal—which is arranged or embedded in the blade interior—by means of a suitably robust connection. Preferably, the interior connector of a lightning attractor is realized for a threaded connection to the terminal. For example, the interior connector of a lightning attractor can be shaped as a bolt with an outer thread, and the terminal can comprise a corresponding threaded bushing to receive the lightning attractor's threaded connector.

A lightning protection arrangement of a rotor blade may incorporate one or more terminals. A terminal is generally placed inside the blade at a suitable location along the blade's length, usually towards the blade tip region since it is the exposed blade tip that is most often struck by lightning. A terminal is electrically connected to one or more down conductors than extend along the blade interior towards the blade root end. The terminal located inside the blade is electrically connected in some suitable manner to a lightning attractor that is located at least partially on the outside of the blade. Usually, a lightning attractor is arranged at a region of the blade that is most susceptible to lightning strikes. A terminal can be connected to a single lightning attractor, or can be realised to be connected to two or more lightning attractors.

In a preferred embodiment of the invention, a trailing edge receptor serves as the receptor of a single-receptor terminal, i.e. a terminal that is designed to connect to only one lightning attractor. This embodiment is an alternative to the known type of receptor which is set into the suction side or the pressure side of the blade. Instead, in this preferred embodiment of the inventive lightning protection arrangement, the trailing edge receptor is directly secured at one end to the terminal, and extends through the blade body into the air behind the trailing edge. In this embodiment of the inventive lightning protection arrangement, the lightning attractor is not set into the blade surface, and the risk of damage to the blade skin is effectively eliminated.

The "attractiveness" of the trailing edge receptor will depend to some extent on various factors such as the material of which it is made, its thickness, its electrical conductivity, its position along the blade, etc. However, a major factor governing the "attractiveness" of the trailing edge receptor will be its length. Therefore, the length of the trailing edge receptor that actually extends outward beyond the trailing edge is chosen to achieve the desired degree of attraction to lightning strikes. Preferably, a trailing edge receptor extends beyond the trailing edge by at least 10 mm, more preferably by at least 50 mm. While it is not possible to define an upper limit to the length of the trailing edge receptor, and since the ion cloud has a finite size, for practical purposes the trailing edge receptor preferably does not extend by more than 500 mm beyond the trailing edge of the blade.

In a particularly preferred embodiment of the invention, a trailing edge receptor is realized such that its extension portion is arranged essentially along a continuation of a camber line of the rotor blade. In such an embodiment, a portion of the trailing edge receptor is effectively embedded in the trailing edge, between the terminal and the outer edge of the blade, while the remainder of the trailing edge receptor extends into the air immediately behind the trailing edge. The "camber line" is a term used in the definition of an airfoil cross-sectional shape, and extends from the leading edge to the trailing edge of the blade. While the camber line usually describes a smooth curve through the airfoil, it generally straightens out towards the trailing edge. An extension of this straight line can define a suitable orientation or position for the exposed portion of the trailing edge receptor. Preferably, at least the exposed part of the trailing edge receptor (i.e. the portion that extends into the air beyond the trailing edge) has an elongate form. For example, the trailing edge receptor can have the form of a flat band with a rectangular cross-section, or may be rod-shaped with a round cross-section, or may have any other suitable shape.

The current passing through a trailing edge receptor will cause it to become very hot, and any surrounding material of the rotor blade will be heated also. The trailing edge is generally the thinnest part of the airfoil. For some types of blade and/or towards the tip region of the blade, the thickness of the blade at the trailing edge may be only a few millimetres. Therefore, in a preferred embodiment of the invention, when the trailing edge receptor is embedded in such a thin trailing edge, the thickness of the rotor blade is augmented around the trailing edge receptor. This can be visualized as a "bulge" enclosing the embedded portion of the trailing edge receptor. The bulge can be formed to present a low profile in order to minimize its impact on the blade's aerodynamic performance, and can effectively withstand the heat resulting from a lightning strike With the inventive lightning protection arrangement, the performance of the rotor blade's LPS can be significantly improved by the improved attractiveness of the trailing edge receptor, and the lifetime of the rotor blade can be favourably extended. In a preferred embodiment of the invention, particularly in the case of very long rotor blades, the lightning protection arrangement can comprise two terminals and two trailing edge receptors arranged to point outward into the air behind the trailing edge. In this preferred embodiment, a first terminal is arranged as close as possible to the blade tip, and the second terminal is arranged further inward from the blade tip. In this way, lightning damage to even a very long blade can be effectively minimized, thereby extending its lifetime and reducing maintenance costs.

In another preferred embodiment of the invention, a trailing edge receptor may be connected to the existing receptor of a conventional single-receptor terminal. For example, a rotor blade lightning protection arrangement may comprise a puck-shaped receptor set into one side of the rotor blade (on the suction side or on the pressure side). This conventional receptor extends through the blade body to connect to the terminal, and can be effective at receiving lightning strikes when the wind turbine blades are stationary. In a retrofitting step, this receptor can be adapted to receive a trailing edge receptor which extends from the receptor along the surface of the blade and outward beyond the trailing edge of the blade. In such a retrofit embodiment of the invention, the existing lightning attractor is "upgraded" by mounting the trailing edge receptor to it. The performance of the existing LPS can be improved by the trailing edge receptor, since it protrudes into the ion cloud that follows in the wake of a blade's trailing edge when the wind turbine blades are rotating.

Equally, in another preferred embodiment of the invention, a trailing edge receptor may be connected to a multi-receptor terminal. For example, a rotor blade lightning protection arrangement may comprise two set-in lightning attractors, arranged on opposite sides of the rotor blade (one on the suction side and one on the pressure side). Each of these oppositely arranged receptors extends through the blade body to connect to the terminal. In a retrofitting step, one of these receptors may be adapted to receive a trailing edge receptor. Alternatively, the terminal itself may be adapted to receive a further lightning attractor, namely a trailing edge receptor extending directly from the terminal through the trailing edge region and beyond the trailing edge.

In a retro-fit embodiment, a trailing edge receptor can be connected to the body of a prior art lightning attractor, and arranged to extend over the airfoil from the lightning attractor body towards the trailing edge, and with an overall length that is sufficient to ensure that a certain portion of the trailing edge receptor extends into the air beyond the trailing edge. Preferably, any part of the trailing edge receptor that lies over the blade preferably follows the shape of the blade to minimize its influence on the aerodynamic behaviour of the rotor blade. Here also, the trailing edge receptor preferably has an elongate form as described above.

The exposed portion of a trailing edge receptor can extend straight outwards from the trailing edge as described above, essentially forming a right angle with the straight line presented by the trailing edge. In this case, the angle between the exposed portion of the trailing edge receptor and an extension of the airfoil camber line would for practical purposes be 0°, i.e. the receptor points straight out from the trailing edge. Equally, the exposed portion of a trailing edge receptor can be arranged at an angle of up to ±60° to the trailing edge.

The inventive lightning protection arrangement described herein has the advantage of providing lightning protection particularly during operation of the wind turbine, i.e. when the rotor blades rotate and each rotor blade drags an ion cloud in its wake. The inventive lightning protection arrangement is therefore particularly suited for implementation as an add-on feature to an existing wind turbine LPS, which are generally also designed to provide sufficient protection against a lightning strike during a standstill of the wind turbine.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
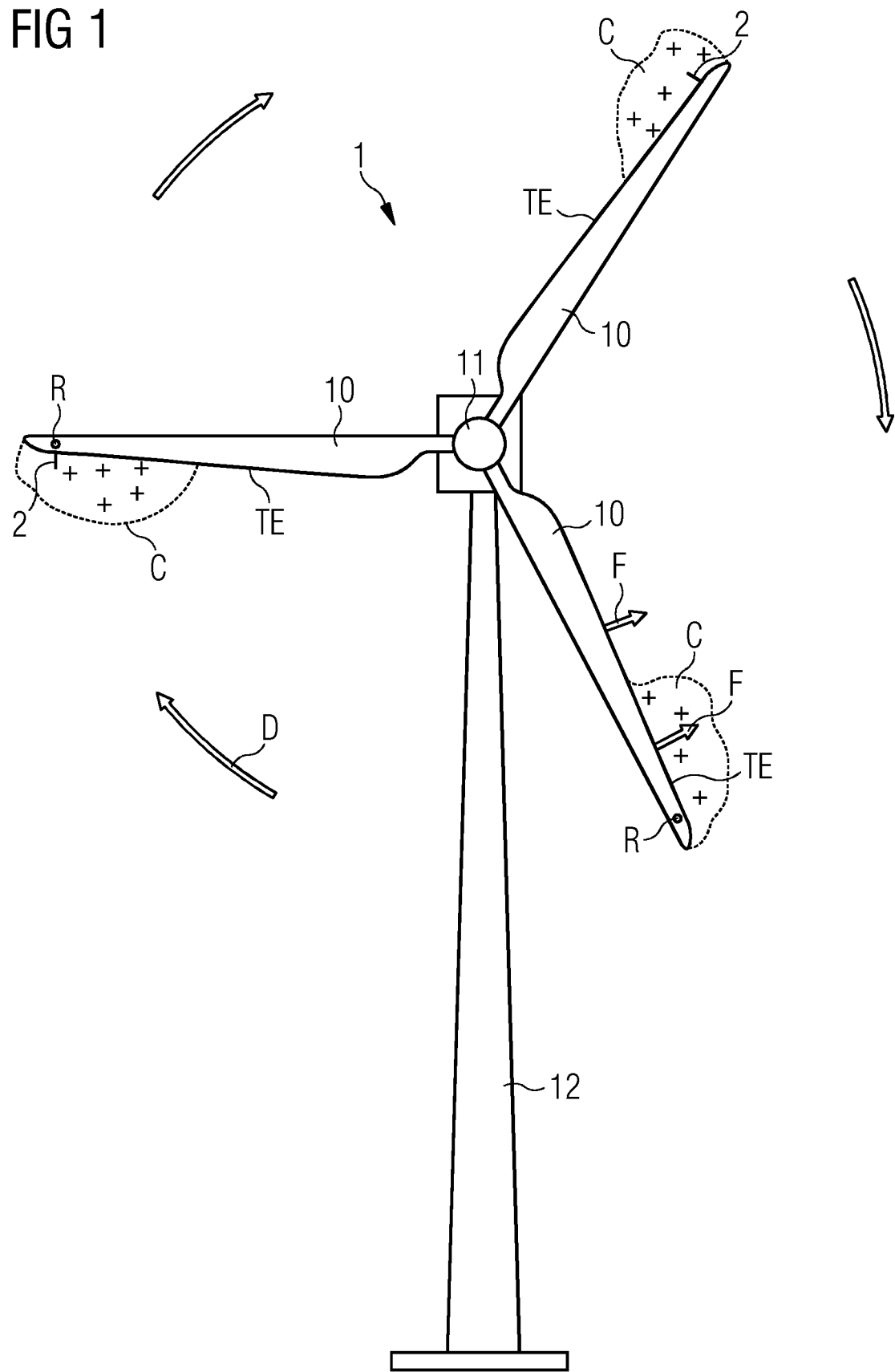
FIG. 1 shows a wind turbine, indicating the positions of lightning receptors on the rotor blades.

FIG. 1 shows a wind turbine 1 of the conventional type, with three rotor blades 10 arranged to rotate in direction D. The blades 10 are mounted to a hub 11, which in turn is attached to a generator housed in a nacelle or canopy, which in turn is mounted on top of a tower 12. With increasing tower height and blade length, particularly in the case of offshore wind turbines, the blades can be very vulnerable to lightning strikes. Also, in geographical regions with a high incidence rate of electrical storms, even a wind turbine of relatively moderate height can be exposed to many lightning strikes per year. To protect the rotor blades 10, these are equipped with a lightning protection arrangement comprising a receptor R at a suitable position at the blade surface. During an electrical storm, an ion cloud C will form around any exposed object that behaves as an attractor, in this case the rotor blades 10 each collect an ion cloud C around their blade tip regions.

The rotor blade 10 at lower right portion of the diagram shows a prior art realization, in which a receptor R is arranged at an outer region of the blade 10 on its suction side. The effectiveness of this type of receptor R is reduced during operation of the wind turbine 1, since a rotating blade 10 moves through the air, and its ion cloud C is displaced into the wake of the trailing edge TE. The receptor R of the prior art lightning protection arrangement is no longer in the middle of its ion cloud C, but to one side, thereby losing some of its attractiveness to a lightning bolt.

The rotor blade 10 at the top of the diagram shows a realization of the invention, in which a trailing edge receptor 2 extends from the blade's trailing edge TE into the ion cloud C. The effectiveness of the receptor 2 is maintained even during operation of the wind turbine 1, since the receptor 2 is always inside the ion cloud C.

The rotor blade 10 on the left-hand-side of the diagram shows another realization of the embodiment of the invention, in which a receptor R of a prior art lightning protection arrangement has been "upgraded" by a trailing edge receptor 2, which extends from the blade's trailing edge TE into the ion cloud C. The effectiveness of the receptor R is maintained even during operation of the wind turbine 1, since the trailing edge receptor 2 is always inside the ion cloud C.

Figure 2:
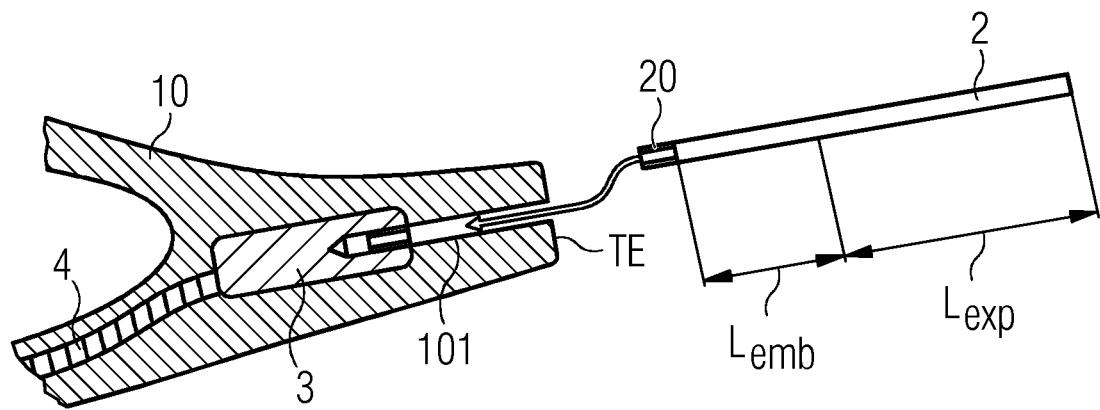
FIG. 2 is a cross-section through a rotor blade and shows a first embodiment of the lightning protection arrangement.

FIG. 2 is a cross-section through a rotor blade 10 and shows a trailing edge receptor 2 of a first embodiment of the inventive lightning protection arrangement. The trailing edge receptor 2 is formed as a rod or bar, with a threaded end 20 for connecting to a terminal 3 in the interior of the blade 10. A portion of the trailing edge receptor 2 with length $L_{exp}$ will be exposed in the air behind the trailing edge TE, and a remaining portion with length $L_{emb}$ will be embedded in the blade 10. The exposed length $L_{exp}$ preferably extends over at least 10 mm, more preferably over at least 50 mm. The diameter of a rod-shaped trailing edge receptor 2 is preferably in the order of 8 mm, for a favourable cross-sectional area of at least 50 mm$^2$ so that the trailing edge receptor 2 can safely carry the high current of a lightning strike.

The terminal 3 is connected in any suitable manner to a down conductor 4 as part of the blade-to-ground current path of the wind turbine's LPS, and this established configuration applies to all diagrams of the present embodiments of the invention. To receive the trailing edge receptor 2, a channel 101 has been provided in the trailing edge region of the blade 10. After the trailing edge receptor 2 has been inserted into the channel 101 and the threaded end 20 has been secured in a corresponding bushing of the terminal 3, a sealant may be used to seal any gaps between the trailing edge receptor 2 and the channel 101 in order to prevent moisture entering the confined space. The sealant therefore reduces the likelihood of damage from expanding freezing water and/or from steam explosion during a lightning strike. This step may be understood to apply to any similar embodiment in the following.

Figure 3:
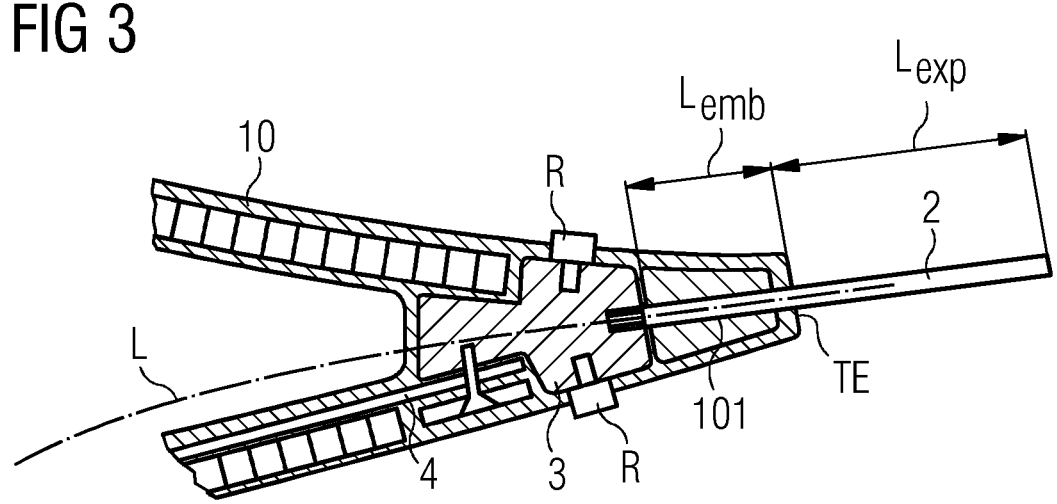
FIG. 3 is a cross-section through a rotor blade and shows a second embodiment of the lightning protection arrangement.

FIG. 3 is a cross-section through a rotor blade 10 and shows a trailing edge receptor 2 of a second embodiment of the inventive lightning protection arrangement. In this case also, the trailing edge receptor 2 is formed as a rod or bar, with a threaded end 20 for connecting to a terminal 3 in the interior of the blade 10, and a channel 101 has been provided in the trailing edge region of the blade 10 to receive the trailing edge receptor 2. The diagram shows that the channel 101 has been formed to lie more or less along the camber line L of the blade 10, so that the trailing edge receptor 2 will act as an extension of the camber line L.

Here also, a portion of the trailing edge receptor 2 with length $L_{exp}$ is exposed in the air behind the trailing edge TE, and a remaining portion with length $L_{emb}$ is embedded in the blade 10. In this embodiment, prior art receptors R are located on the suction side and pressure side of the blade 10. This realization may therefore be a retro-fit embodiment of the inventive lightning protection arrangement in which a known type of terminal 3 is adapted to also receive a trailing edge receptor 2, in addition to the two receptors R.

Figure 4:
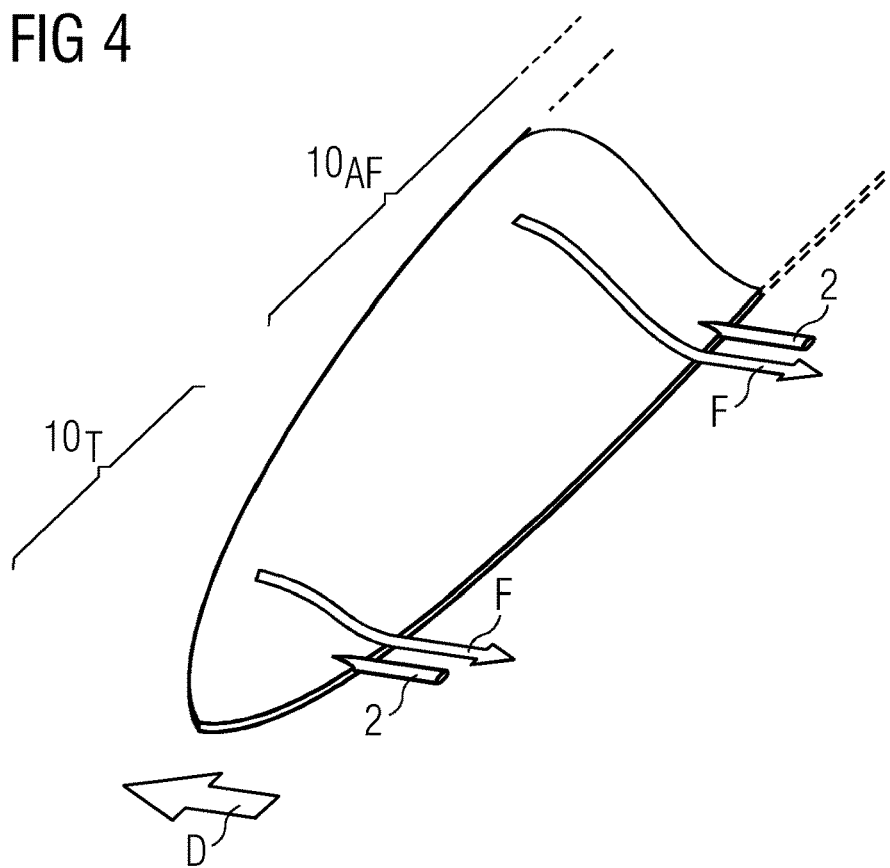
FIG. 4 shows a rotor blade with an embodiment of the lightning protection arrangement based on the embodiment shown in FIG. 2.

FIG. 4 shows a rotor blade 10 with an embodiment of the inventive lightning protection arrangement based on the embodiment shown in FIG. 2. Here, two terminals (not shown) are embedded in the blade 10: one near the blade tip $10_T$ and one in the blade airfoil $10_{AF}$. A first trailing edge receptor 2 is connected to the terminal in the blade tip $10_T$, and a second trailing edge receptor 2 is connected to the terminal in the blade airfoil $10_{AF}$. The diagram also indicates the blade's direction of rotation D and the direction F of the airflow over the blade 10, and shows that the receptors 2 have essentially no impact on the airflow. This is an important consideration, since the effectiveness of a wind turbine rotor blade 10 depends to a large extent on how well the boundary layer of the airflow can be maintained. A prior art receptor, mounted on the suction side of a blade 10, must lie close to the surface of the blade, and this requirement already reduces the effectiveness of the prior art receptor as a lightning attractor.

Figure 5:
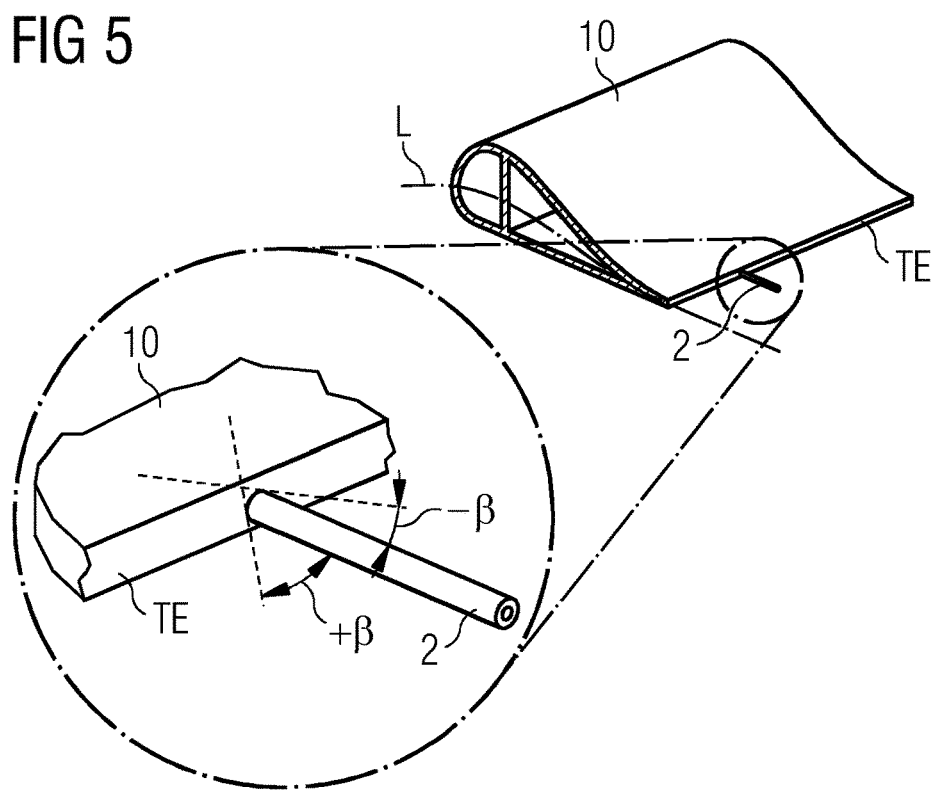
FIG. 5 shows a rotor blade with another embodiment of the lightning protection arrangement based on the embodiment shown in FIG. 2.

FIG. 5 is a cross-section through a rotor blade 10 and shows a trailing edge receptor 2 in an embodiment as described in FIGS. 2-4 above. Here, the trailing edge region of the blade 10 is relatively thick, so that the trailing edge TE presents a flat face, and the trailing edge receptor 2 can be completely contained within the trailing edge region over its embedded length. The enlarged view of this diagram shows a possible range for an angles or skewed arrangement of the trailing edge receptor 2. In the event that the trailing edge receptor 2 is arranged to subtend an angle β (within a range of ±60°) to the camber line L, it will be understood that the terminal 3 will be located at the end of one of the diagonals indicated in the diagram. Preferably, the trailing edge receptor 2 will be arranged to lie in the plane of the camber line so that it does not bend upward or downward from the trailing edge part of the blade.

Figure 6:
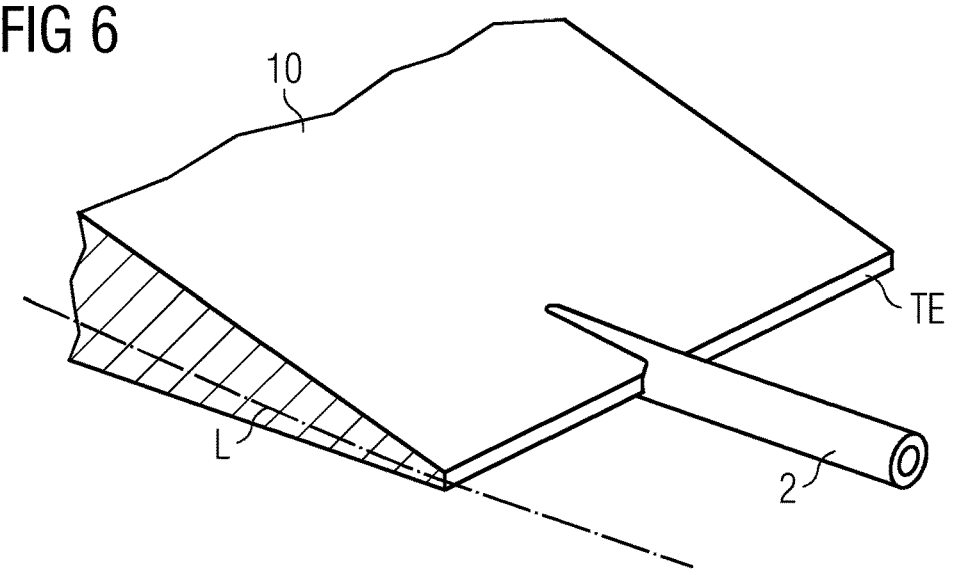
FIG. 6 shows a rotor blade with another embodiment of the lightning protection arrangement based on the embodiment shown in FIG. 2.

FIG. 6 is a cross-section through a rotor blade 10 and shows a trailing edge receptor 2 in another embodiment of the inventive lightning protection arrangement. In this embodiment, the trailing edge region of the blade 10 is very thin, so that the upper and lower surfaces of the trailing edge receptor 2 remain exposed over some part of the embedded portion of the trailing edge receptor 2.

Figure 7:
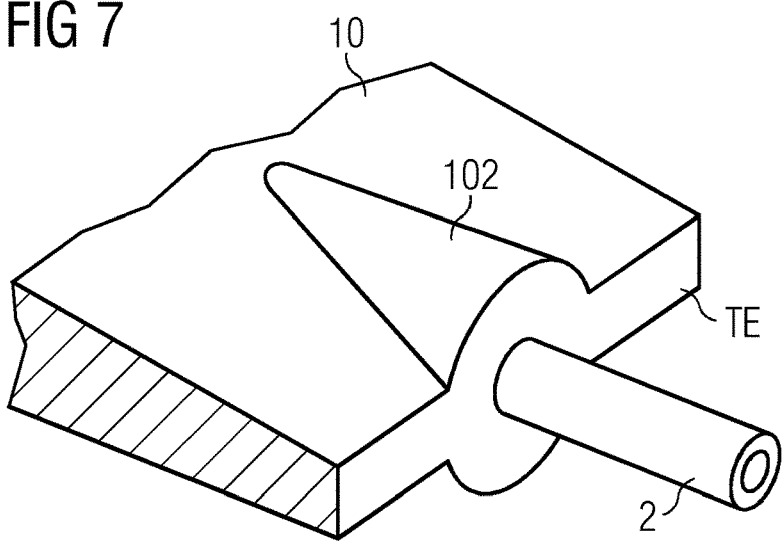
FIG. 7 shows a rotor blade with another embodiment of the lightning protection arrangement based on the embodiment shown in FIG. 2.

FIG. 7 shows a rotor blade with another embodiment of the inventive lightning protection arrangement, and can be used to remedy the situation described in FIG. 6 above. Here, the trailing edge part of the blade 10 has been thickened in the region surrounding the channel formed to receive the trailing edge receptor 2. This thickened area 102 can be shaped to minimize its impact on the aerodynamic performance of the blade 10.

Figure 8:
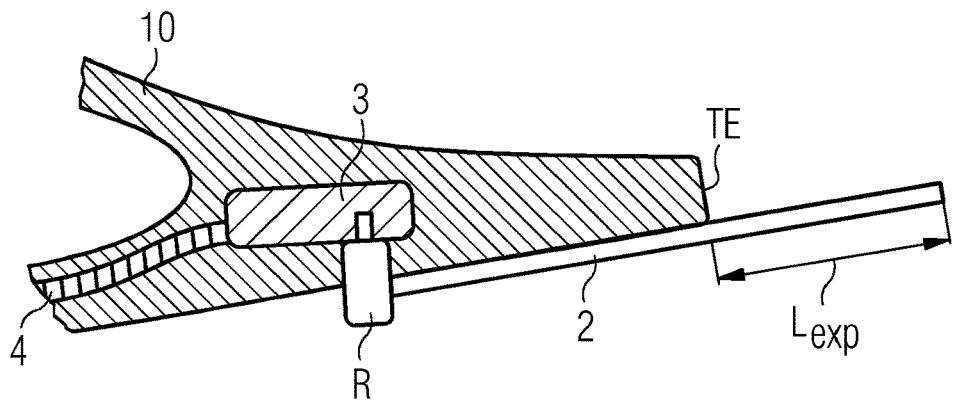
FIG. 8 is a cross-section through a rotor blade and shows another embodiment of the lightning protection arrangement.

FIG. 8 is a cross-section through a rotor blade 10 and shows another embodiment of the inventive lightning protection arrangement. Here, the receptor R of an existing rotor blade lightning protection arrangement has been adapted to receive a trailing edge receptor 2. This retro-fit adaptation of the receptor R can be achieved by forming a threaded bore in the receptor R and inserting a rod-shaped trailing edge receptor 2 of the type shown in FIG. 2. This retro-fit solution can be relatively easily be carried out for an already installed rotor blade 10, since it is only necessary to replace the existing receptor by one that has been adapted to receive a trailing edge receptor 2. In this case, the length of the trailing edge receptor 2 is chosen to extend from the receptor R to a desired distance beyond the trailing edge TE.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A lightning protection arrangement of a wind turbine rotor blade, comprising:
   at least one terminal connected to a down conductor arranged in a blade interior; and
   a plurality of lightning attractors electrically connected to the at least one terminal, wherein at least one lightning attractor comprises an interior connector for making electrical contact to the at least one terminal and a trailing edge receptor arranged to extend beyond a trailing edge of the wind turbine rotor blade in a direction opposite to a direction of travel of the wind turbine rotor blade;
   wherein the trailing edge receptor is partially embedded in the wind turbine rotor blade between the at least one terminal and the trailing edge;
   wherein a thickness of the wind turbine rotor blade is augmented around the trailing edge receptor between the at least one terminal and the trailing edge in a blade body region enclosing the partially embedded portion of the trailing edge receptor.

2. The lightning protection arrangement according to claim 1, wherein the trailing edge receptor is connected to a single-receptor terminal.

3. The lightning protection arrangement according to claim 1, wherein the trailing edge receptor is connected to one lightning attractor of a multi-receptor terminal.

4. The lightning protection arrangement according claim 1, wherein the trailing edge receptor extends beyond the trailing edge by at least 50 mm.

5. The lightning protection arrangement according to claim 1, wherein the trailing edge receptor has an elongate form.

6. The lightning protection arrangement according to claim 1, wherein the trailing edge receptor is arranged in a plane of a camber line of the wind turbine rotor blade.

7. The lightning protection arrangement according to claim 1, wherein the trailing edge receptor subtends an angle within a range of ±60° to a camber line of the wind turbine rotor blade.

8. A wind turbine rotor blade comprising a root region, an airfoil region and a blade tip region, and further comprising the lightning protection arrangement according to claim 1 arranged in the airfoil region and/or the blade tip region.

9. The wind turbine rotor blade according to claim 8, further comprising a first trailing edge receptor electrically connected to a first terminal arranged within the blade tip region, and a second trailing edge receptor electrically connected to a second terminal arranged within the airfoil region.

10. A method of equipping a wind turbine rotor blade with a lightning protection arrangement, of the method comprising:
    providing at least one terminal in a blade interior and electrically connecting a terminal to a down conductor arranged in the blade interior;
    providing a trailing edge receptor arranged to extend beyond a trailing edge of the wind turbine rotor blade in a direction opposite to a direction of travel of the wind turbine rotor blade;
    electrically connecting the trailing edge receptor to the terminal; and
    increasing a thickness of the wind turbine rotor blade around the trailing edge receptor between the at least one terminal and the trailing edge in a blade body region enclosing a partially embedded portion of the trailing edge receptor.

11. The method according to claim 10, further comprising the step of forming the terminal to receive the trailing edge receptor arranged essentially along a camber line of the wind turbine rotor blade and partially embedded in a trailing edge region of the blade.

12. The method according to claim 10, further comprising the step of adapting a receptor to receive the trailing edge receptor.

* * * * *